US005939805A

United States Patent [19]
Vanduyn

[11] Patent Number: 5,939,805
[45] Date of Patent: Aug. 17, 1999

[54] STATOR SHIELD FOR A FANLESS SALIENT POLE MACHINE

[75] Inventor: Martin Vanduyn, Peterborough, Canada

[73] Assignee: General Electric Canada Inc, Mississauga, Canada

[21] Appl. No.: 08/897,544

[22] Filed: Jul. 21, 1997

Related U.S. Application Data

[63] Continuation-in-part of application No. 08/607,400, Feb. 27, 1996, abandoned.

[30]  Foreign Application Priority Data

Apr. 18, 1995 [CA] Canada ................................. 2147197

[51] Int. Cl.$^6$ ...................................................... H02K 9/00
[52] U.S. Cl. ................................ 310/58; 310/52; 310/57; 310/89; 310/254
[58] Field of Search ................................. 310/89, 55, 58, 310/59, 60 R, 52, 57, 254

[56]  References Cited

U.S. PATENT DOCUMENTS

| | | | |
|---|---|---|---|
| 967,240 | 8/1910 | Roberts | 310/58 |
| 3,413,499 | 11/1968 | Barton | 310/58 |
| 3,739,208 | 6/1973 | Shartrand | 310/58 |
| 4,118,645 | 10/1978 | Calfo et al. | 310/53 |
| 4,324,993 | 4/1982 | Sato et al. | 310/58 |
| 4,442,371 | 4/1984 | Utsunomiya et al. | 310/260 |
| 4,546,279 | 10/1985 | Hammer et al. | 310/59 |
| 4,609,840 | 9/1986 | Eats et al. | 310/58 |

FOREIGN PATENT DOCUMENTS 1106989  3/1968  United Kingdom ............. H02K 9/08

*Primary Examiner*—Nestor Ramirez
*Assistant Examiner*—Burton S. Mullins
*Attorney, Agent, or Firm*—Edward H Oldham

[57]  ABSTRACT

A fanless salient pole DEM is provided with annular shrouds fitted to the stator ends in close juxtaposition to the rotor to isolate the rotor from atmospheric pressure during operation of the DEM.

12 Claims, 5 Drawing Sheets

PRESSURE stator shield for a fanless salient
pole machine

BACKGROUND OF THE INVENTION

This application is a continuation-in-part of U.S. patent application Ser. No. 08/607,400 filed Feb. 27, 1996 now abandoned.

Dynamo electric machines (DEM's) produce heat during operation. Heat is produced in the coils through which electric current is passing, and heat is produced in the iron parts which are periodically undergoing cyclic magnetization. The heat produced in the operating DEM must be removed in order to prevent thermal failure of the machine.

The ultimate rating of any DEM must necessarily be based on the temperature rise of the machine during operation. Manufacturers have been able to improve the capabilities of the coil insulation to withstand higher operating temperatures, but even with improved high temperature insulation some means must be found to remove heat from the machine.

Thus methods of cooling the various parts of the operating machine usually involve the passage of a suitable heat conducting medium through the various parts of the machine that are heated during operation. The most usual medium used to remove the heat from these machines is air.

This invention is directed to an improvement in cooling as it applies to a fanless salient pole DEM. Prior art salient pole machines, that is a DEM in which the rotor poles protrude separately and individually (such as shown in FIG. 1) have traditionally relied on axial fans to force ventilation air through the DEM to cool the machine. The axial fans may be made to move the cooling air in a very effective manner but the axial fans can and do consume significant amounts of power in moving the ventilation air with a consequential loss of machine efficiency.

This application is directed to a salient pole DEM which is completely fanless and which utilizes only the salient poles of the machine to motivate the ventilation air to move through the machine.

Because the salient poles of prior art machines are designed primarily to produce magnetic flux, the secondary function, that is to act as an air pump, is usually sacrificed.

The evolution of fan type ventilation systems for prior art salient pole machines has involved methods to channel the cooling air through the various sections of the machine in a variety of ways, each having its own particular advantages and disadvantages.

This invention relates to a method of moving the air through the rotor and stator of a fanless salient pole DEM by improving the pumping efficiency of the salient poles of the rotor by partially enclosing the ends of the rotor with annular shields. The shields effectively extend the stator ends inwardly toward the rotor shaft so that only the lower portions of the salient rotor poles are exposed to view. Thus the top portions of the rotor poles are completely shielded by the annular shields which are fixed to the stator ends of the DEM by some predetermined method.

It will be shown that the airflow produced by the rotating salient poles when enclosed by the annular shields will be such as to produce a machine temperature profile which is acceptably uniform and the ultimate efficiency of the machine will be improved over an axial fan equipped salient pole DEM of a similar construction due to the power consumed by the shaft driven axial fans.

The improvement will be applicable to all salient pole machines (cylindrical rotor machines by their nature produce little or no pressure head during rotation) and because it is primarily intended that this invention be applied to fanless salient pole DEM's, it will be apparent that this invention will apply to salient pole DEM's which must have bi-directional rotation capability; fan cooled machines are limited to rotation in one direction only.

It is an object of this invention to improve the cooling efficiency of a salient pole dynamo electric machine to which this invention relates.

It will also be found that the life of the machine may be extended or the rating of a particular machine may be increased to take advantage of the increased cooling resulting from application of this invention.

BRIEF DESCRIPTION OF THE DRAWINGS

These and other advantages will become apparent when the following description is taken with the accompanying drawings in which.

DESCRIPTION OF THE PREFERRED EMBODIMENTS

Figure 1:
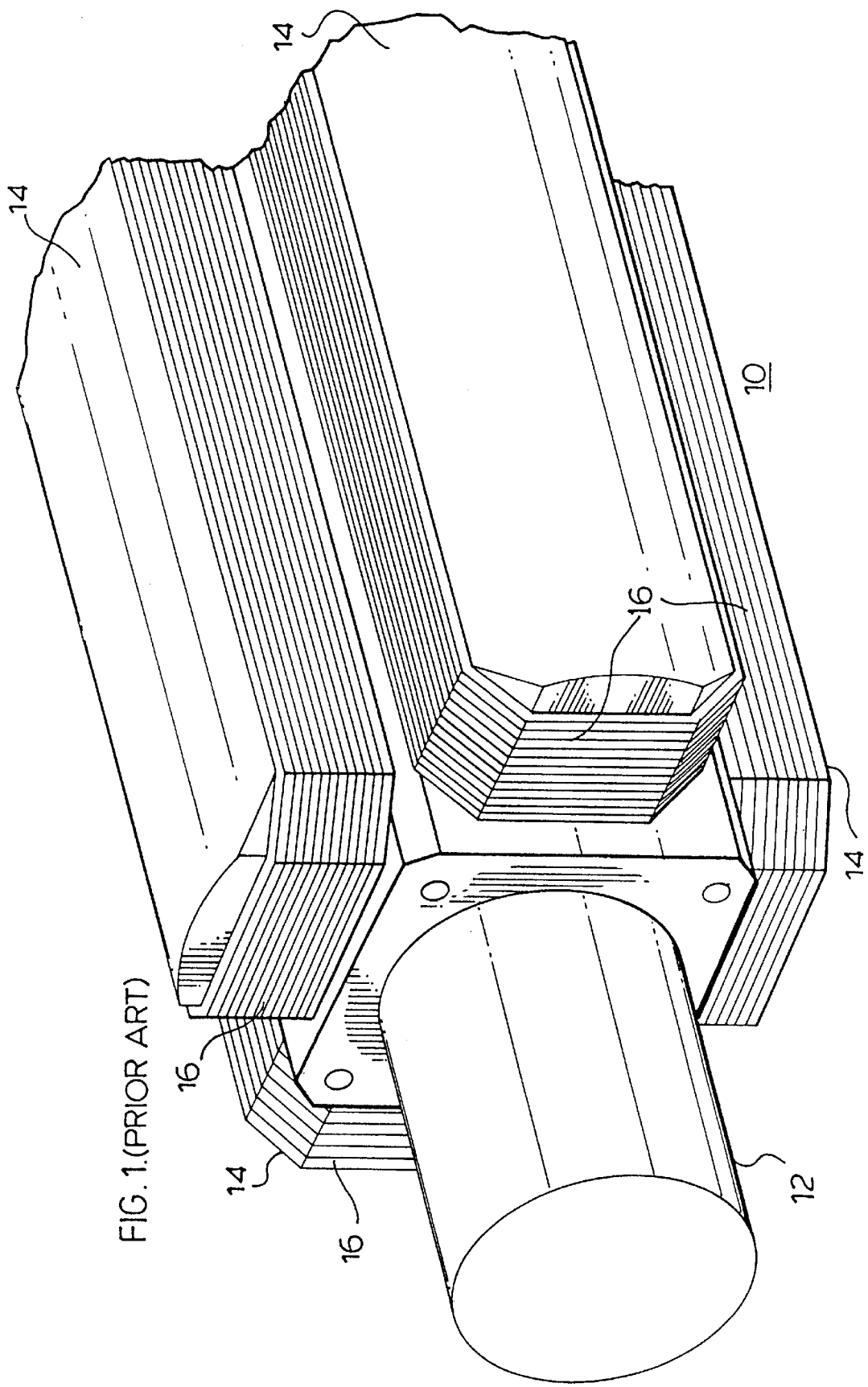
FIG. 1 is a perspective view of a prior art salient pole rotor for a dynamo electric machine.

Referring now to the drawings, FIG. 1 illustrates a salient pole rotor 10 for a dynamo electric machine of the prior art. Rotor 10 comprises a shaft 12 on which are mounted four poles 14 on which suitable field coils 16 are wound. It is this rotor structure alone that will be used to move the ventilation air through the DEM of this invention.

Figure 2:
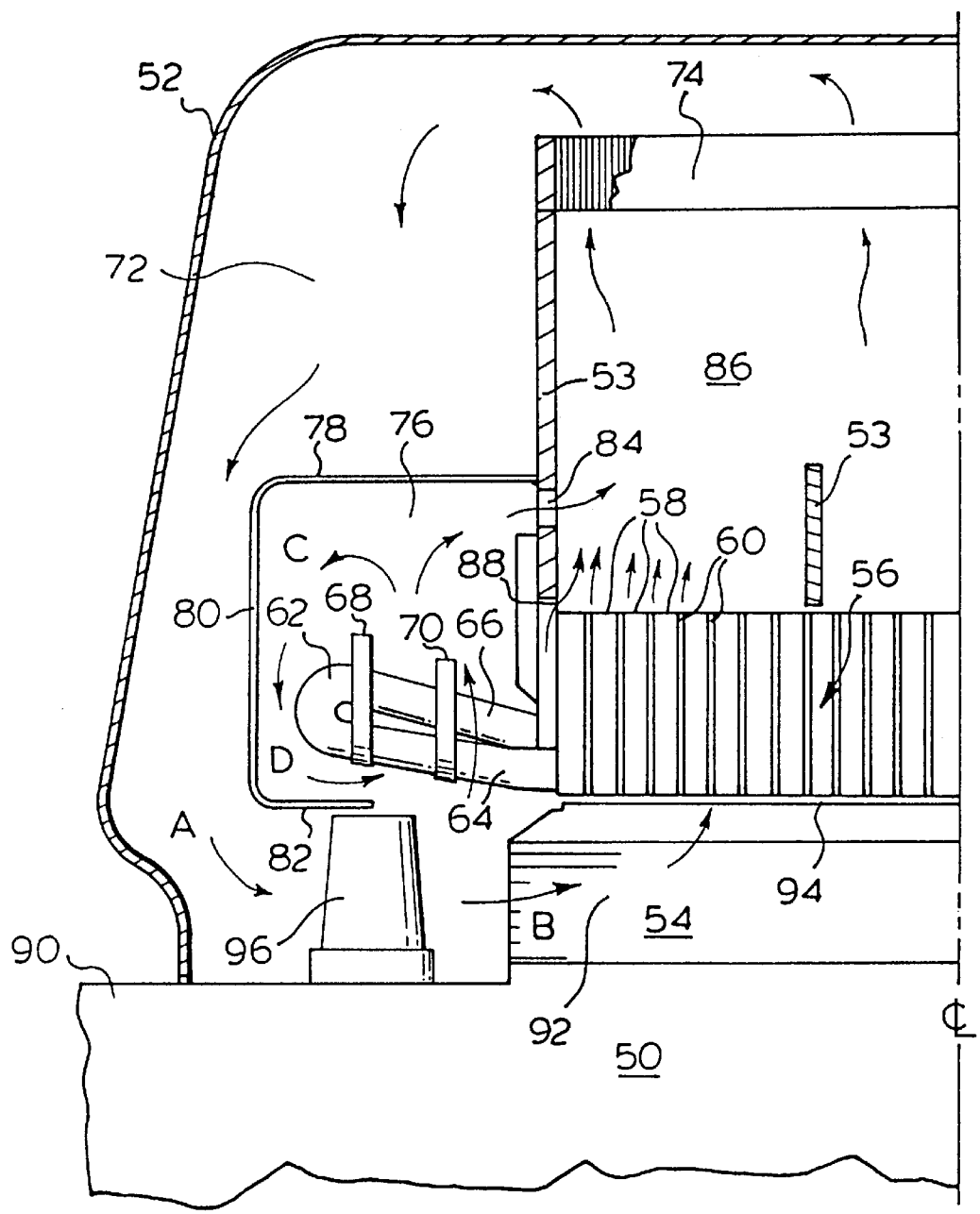
FIG. 2 is a cross sectional view of part of a prior art salient pole dynamo electric machine which utilizes a parallel air flow for cooling the machine and FIG. 2A which shows the air pressure distribution across the air gap of the machine of FIG. 2.

FIG. 2 shows a fan equipped DEM 50 as an example of a prior art parallel air flow type of ventilation system. Housing 52 is made to surround the machine and provide the necessary enclosure for the various parts of the motor so that cooling air may be contained and directed in predetermined paths within the enclosure 52. A stator frame 53 (only partly shown) is provided to support the various parts the machine 50.

A stator core 56 is firmly secured in stator frame 53 and is generally shown comprising packets of laminations 58 stacked together in such a manner to form annular ventilation spaces 60 at predetermined intervals axially spaced along the axis of the stator 56.

At each end of the stator core 56, the coil ends or end heads 62 are shown protruding therefrom. Coil 62 is shown having an inner leg 64 and an outer leg 66 passing into stator core 56. The coil ends such as 62 may be braced together at rings 68 and 70 to provide radial support for the coil ends 64.

Air inlet chamber 72 is formed in housing 52 surrounding the stator frame 53 and the stator coil end heads 62. Air is shown exiting a heat exchanger 74 attached to the top of stator, which in this instance supplies cooled air to chamber 72. The heat exchanger 74 forms no part of this invention.

Chamber 72 surrounds another chamber 76 formed by shield assembly 78, 80, and 82 which provides isolation between the end turns 62 and chamber 72.

The stator frame 53 is provided with a series of exit apertures 84 which allow air to flow from chamber 76 to chamber 86. Other ducts such as 88 also permit air flow from chamber 76 into chamber 86 surrounding stator core 56.

Rotor 54 is housed in stator frame 53 and comprises a shaft 90 journalled in suitable bearings (not shown) for rotation within stator core 56, and a set of magnetic flux generating pole pieces such as the one shown at 92 are mounted securely on or, are integral with shaft 90 for rotation therewith. The poles such as 92 are made to clear the inside of the stator by the width of the air gap shown at 94.

Shaft 90 also carries an axial fan 96 which rotates with the shaft 90 to propel the ventilation air through the DEM.

The operation of the machine 50 is as follows:

Shaft 90 rotates at a predetermined speed as determined by the number of poles in the machine 50 and the frequency of the supply to which it is connected. A 4 pole machine operating on a 60 Hz system will have a rotor rotational speed of 1800 rpm.

With the rotor rotating at its rated speed, the axial fan 96 will pump air from left to right so that air will enter inlet chamber 72 from cooler 74, flow in the direction of the arrows A and through the blades of fan 96 and into the spaces between the rotor pole pieces 92 as indicated by B. The pole pieces further increase the pressure of the air as they rotate and the air is pumped through ventilation spaces 60 in stator core 56. The air enters chamber 86 at the exterior of stator core 56 and exits to atmosphere or to a heat exchanger 72.

The air stream passing through fan 96 also moves into chamber 76 as shown at C and recirculates as shown at D. The air in chamber 76 exits through apertures such as the one shown at 84 in stator end frame 53 and through duct 88 in the end of stator frame 53 into chamber 86 at the exterior of stator core 56.

Figure 2A:
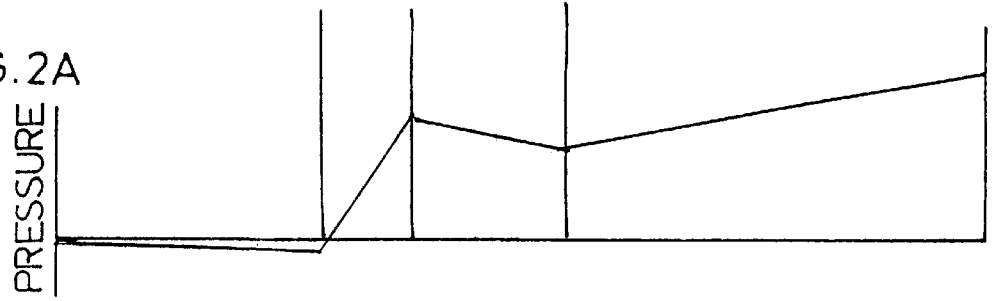

The pressure profile of the air passing through the machine is shown in FIG. 2A. An examination of FIG. 2A shows that the pressure in chamber 72 is slightly negative and becomes more negative as the cooling air approaches fan 96. The air pressure increases abruptly when the air passes through fan 96 and then the pressure decreases slightly as the air is driven into the rotor space. Here the pressure of the air increases until the center line of the machine is reached (it is assumed that the machine is symmetrical). The center of the machine passes more air through the slots 60 than the outside ventilation slots of machine. It is to be remembered that the cooling air will be heated as it passes by the coils of the rotor 54 thus, the cooling air temperature will be greater at the center of the air gap than at the outside ends.

The air in chamber 76 flows in a plurality of paths, with some of the air passing through the winding legs 64 and 66 and thence through aperture 84 into chamber 86 and to heat exchanger 74 (if the machine 50 utilizes a recirculating air system). Part of the cooling air recirculates around the chamber 76 as shown by arrows "D" and part of the air flows through duct 88 to chamber 86.

It is found that the quantity of air forced through the stator ventilation spaces will have substantial pressure due to the combined effect of the fan 96 and the crude rotor pole air pump, thus, the stator and rotor cooling requirements are readily met by this cooling scheme. The air flow through the end heads 62 of the coils is substantial and effective cooling of coils will result with this scheme.

The motor of FIG. 2 may not be reversed in rotation because of the directional aspects of the axial fan 96, and although the cooling capabilities of this scheme are excellent because of the large volume of airflow, the resultant low operating temperature is achieved at the expense of efficiency due to the significant power loss associated with the axial fan. Usually a prior art machine such as the one illustrated in FIG. 2 will be equipped with a pair of axial fans, one at each side of the rotor poles.

Figure 3:
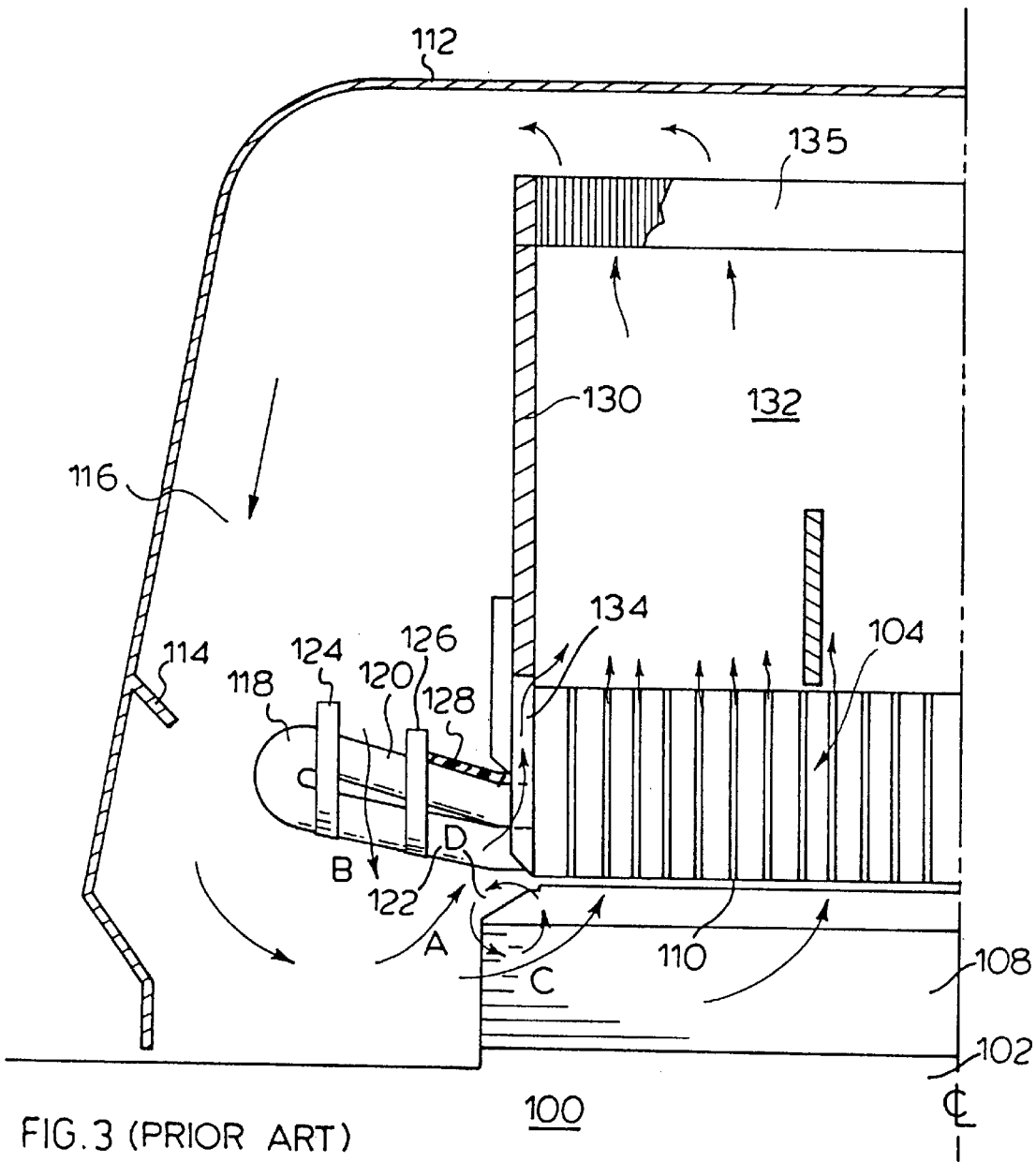
FIG. 3 is a cross sectional view of a portion of a series flow type ventilation system for a salient pole dynamo electric machine of the prior art.

Referring now to FIG. 3 where a partial view of the cross section of a prior art series flow DEM 100 is shown; some of the housing has been omitted for the sake of clarity.

DEM 100 shows a rotor 102 rotating in a stator core 104. Rotor 102 is similar to prior rotor 54 in FIG. 2 except that a fan such as 96 in FIG. 2 is omitted from the shaft 106 in FIG. 3. Pole pieces 108 are the only air motivating devices for the motor 100. Air gap 110 exists between rotor 102 and stator 104. A heat exchanger is shown at 135 which is optional depending on the motor installation.

Stator core 104 is housed in a housing, part of which is shown at 112. Baffle 114 is shown for directing the incoming air in the chamber 116 around the end turns 118. End turns are placed in the stator in exactly the same manner as shown previously with legs 120 being at the bottom of the stator slots and legs 122 being at the top of the stator slots.

End turn support rings 124 and 126 support the end turns as shown and described previously. A band 128 is placed around the end turns 120 to form a crudely shaped cylinder to improve air flow in the region of the end turns.

As shown previously, the stator is housed in a frame, part of which is shown at 130 which forms part of chamber 132 at the exterior of the stator. A stator end duct 134 is formed in the end of the stator frame to provide an air channel between chamber 116 and chamber 132.

Motor 100 operates as follows:

Rotor 102 rotates at a preselected speed as previously stated. Poles 108 are the only air motivating force in the machine 100. As the rotor 102 rotates, air from heat exchanger 135 is drawn into chamber 116 where it passes over end turns 118 and makes the turn toward the rotor poles. Baffle 114 provides a deflector which assists the incoming air to pass over the end turns 118. Air shown on path A helps cool the remote ends of the end turns remote from stator 104, while air path B cools the mid portions of end turns 118.

Air is being pulled into the spaces between adjacent poles 108 on the rotor 102 as shown by arrow C and the pressure of the air increases as it moves toward the center of the machine. The rotor air becomes pressurized and passes across air gap 110 into the ventilation slots in the stator as previously.

Some of the cooling air will be forced to pass through duct 134 to cool the end of the stator. All the heated ventilating air is gathered in chamber 132 where it will be exhausted to a heat exchanger 135 or to atmosphere depending on the ventilation system being utilized.

Figure 3A:
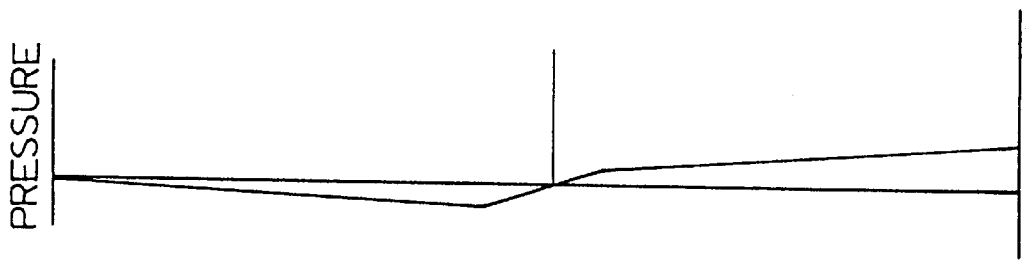
FIG. 3A shows the air pressure distribution across the air gap of the machine for the machine of FIG. 3.

A pressure profile of the machine 100 is shown at FIG. 3A. It will be seen that the maximum pressure in the machine is substantially reduced over the prior art machine illustrated in FIG. 3 because of the absence of the shaft driven fan.

The pressure in chamber 116 will be slightly negative and the pressure at the ends of the rotor becomes only slightly positive as the spill over of the rotor air at the pole ends results in the turbulent flow shown at D. The pressure of the air increases as it passes through the rotor until the center of the machine is reached where the air pressure becomes a maximum.

This ventilation system has distinct advantages over the prior art DEM of FIG. 2. Although the air pressure in the machine cannot possibly approach the pressure found in the air gap of the fan augmented DEM, nevertheless, the machine of FIG. 3 cools equally well for rotation in either direction, thus, the machine is reversible, and the cooling of the end turns is quite effective because a large volume of incoming air must pass through and around the end turns, extracting heat from these heat generating sources on its way into the rotor.

The DEM of FIG. 3 may be shortened in actual length because of the absence of fans at the remote ends of the rotor shaft, and the end enclosures may be designed to provide the most effective air flow over the end turns of the stator coils without the use of any stator end head enclosures such as 78 as shown in FIG. 2.

Because the axial length of the machine may be reduced, it will be found that a substantial saving in material will result, and because the rotor shaft may be shortened the $L/D$ ratio of the shaft is decreased, yielding an increase in stiffness of the rotor shaft. This feature is important in reducing vibration in machines with longer rotor shafts.

Lastly, even though the DEM of FIG. 3 is not as effectively cooled as the DEM of FIG. 2, it is inherently more efficient than the machine of FIG. 2 because of the absence of the power loss associated with two axial fans.

The band 128 encircling the outer end turns may be designed to duct air flow past the end turns in the most effective manner. Band 128 will also have an influence in the amount of air entering duct 134 in the end of the stator 104.

Figure 4:
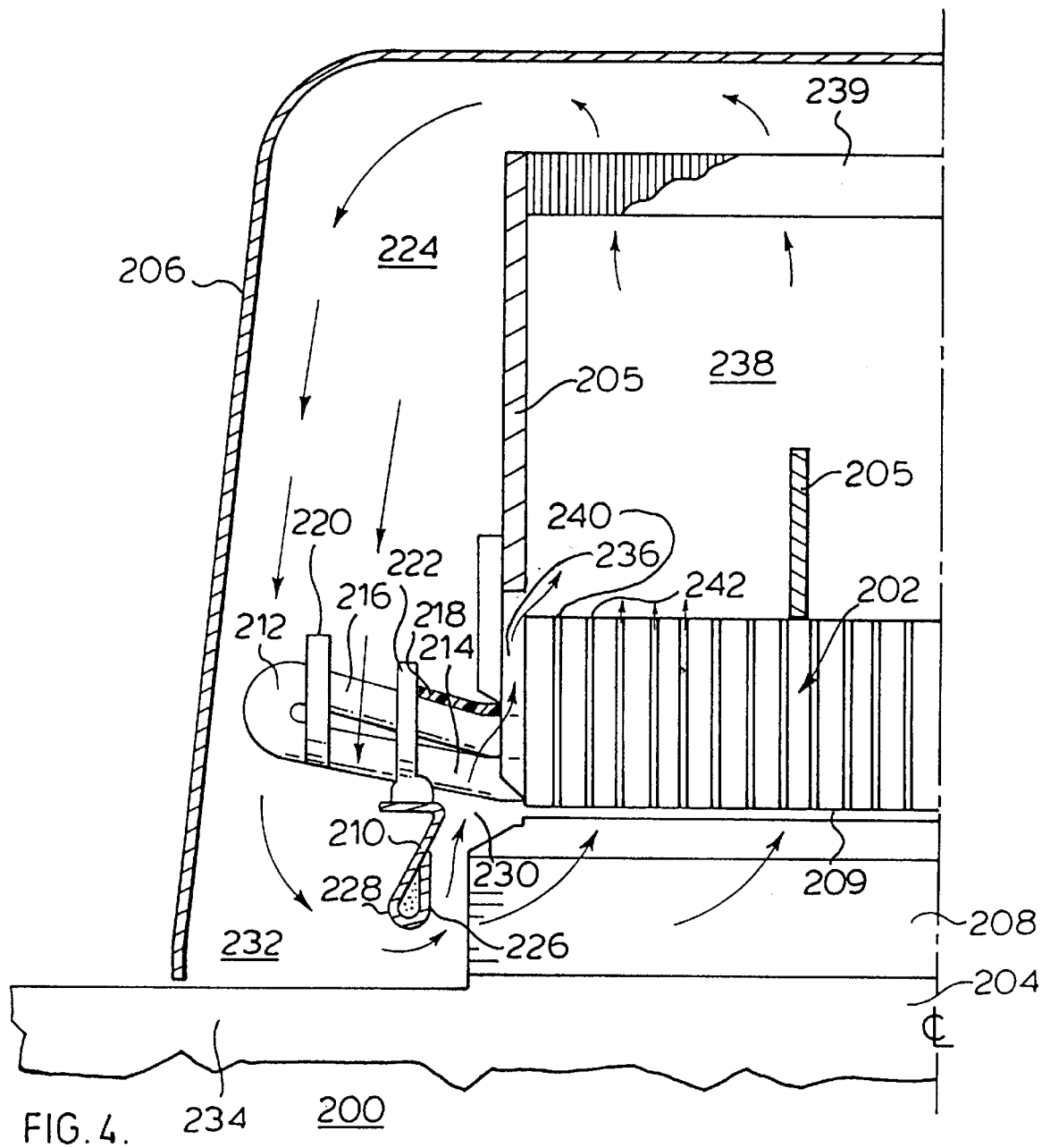
FIG. 4 illustrates a cross sectional view of a portion of a salient pole machine utilizing the present invention for a series flow ventilation system.

The application of the present invention will be found in FIG. 4 where a series air flow DEM 200 is shown having no axial fans mounted on the rotor shaft. Referring now to FIG. 4, DEM 200 is illustrated having a stator core 202 and rotor 204 supported in stator frame 205 (only partially shown). The motor is housed in housing 206 (only a part of which is shown) to enclose stator core 202 and rotor 204 and provide a suitable circulating paths for the cooling air. Rotor 204 is supplied with a set of poles 208 as in previous figures for providing the rotating magnetic flux from the rotor 204. Again, an air gap 209 is present between the stator 202 and rotor poles 208. In this instance, motor 200 is shown having a re-circulating ventilation system utilizing heat exchanger 239.

The stator 202 is quite similar to the machine illustrated in FIG. 3, with the exception of shield or shroud shown at 210 which is secured to the end turns 212 at their inner legs 214. A band 218 encircles the outer legs 216. A pair of bracing rings 220 and 222 are provided for radial support of the end turns 212. The band 218 and support ring 222 essentially form a chamber around the end turns for the isolation of the end turns inside ring 222 from air entering inlet 224.

The shroud 210 is sealingly secured to the inside of bracing ring 222 by means of a suitable sealant material. The shroud has a wall section 226 which is formed into a tubular section 228. The interior of tubular portion 228 may be filled with a suitable filler material to provide the necessary stiffness to the interior of the shroud. Such a material would be a foamed polystyrene or a foamed polyurethane. The essential feature of the invention is that an interior chamber 230 is formed by shroud 210, end ring 222, band 218 which is essentially isolated from air entering duct 224 and the chamber 232 adjacent shaft 234 of rotor 204.

The stator core 202 is constructed in a similar manner to previously shown stator cores, with pockets of laminations forming ventilation slots therein. A duct 236 in the stator end frame 205 adjacent the end legs 214 and 216 provides for air flow between the chamber 230 and chamber 238 surrounding the stator core 202.

The operation of the ventilation of fanless DEM 200 is as follows:

Rotor 204 provides the pumping action to motivate the air flow through the machine in a similar manner to the rotor 102 of FIG. 3. Air enters the housing at duct 224 and passes through and around the outward ends of coil end heads 212 to cool the surfaces thereof. Air also passes between bracing rings 220 and 222 to cool the sections of end coils 212 located between these rings. Air passes into the spaces between the rotor poles 208 by passing around the tubular portion 228 of shroud 210 and is compressed by the rotating rotor poles 208. Because shield 210 provides isolation of the chamber 230 so formed from atmospheric pressure, the air pressure formed in the air gap pressurizes into the chamber 230. Because of the limited clearance between the ends of poles 208 and shield 210, a crude seal is formed by the rotating rotor poles and the shield 210.

The increase in air pressure in the region 230 is significant because it produces a more desirable air flow in the stator ducts at the remote ends of the stator core 202. For instance, the air flow through duct 236 will be substantially increased over the air flow in the corresponding duct of the motor 100 in FIG. 3. The air flow in the outer stator ducts such as 240, 242 will be substantially increased over the prior art motor of FIG. 3.

Figure 4A:
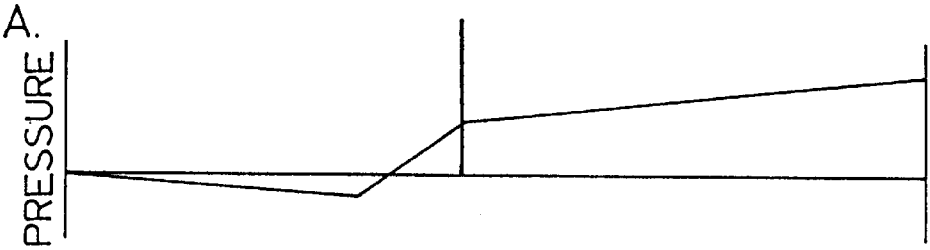
FIG. 4A shows the air pressure distribution across the air gap of the machine for the machine of FIG. 4.

The pressure profile is shown in FIG. 4A. The pressure profile shows that with the presence of shroud 210, the pressure profile across the air gap is somewhat more equalized so that the ventilation spaces in the stator near the ends carry significantly more cooling air than the prior art machines. The cooling efficiency of the machine is increased by the pressure equalization provided by the shield 210 and the elimination of lossy vortexes created at the ends of the rotor when the shield is absent.

The advantages become obvious; the increased cooling improves the rating or life of the machine 200. The machine may be shortened because of the lack of bulky chambers for directing air flow in the ends of the machine. The end coils are cooled by air passing in two directions over their surface. The rotor as previously is able to be shortened and the resultant stiffness may improve the operation of the rotor 204 in motor 200. Lastly, the motor will operate with equal cooling efficiency while rotating in either direction. The overall efficiency of this DEM is higher than a similar DEM equipped with axial fans. The presence of the annular shields of each end of the rotor makes no significant change in the power consumed by the rotor in moving the ventilation air in the DEM.

Figure 5:
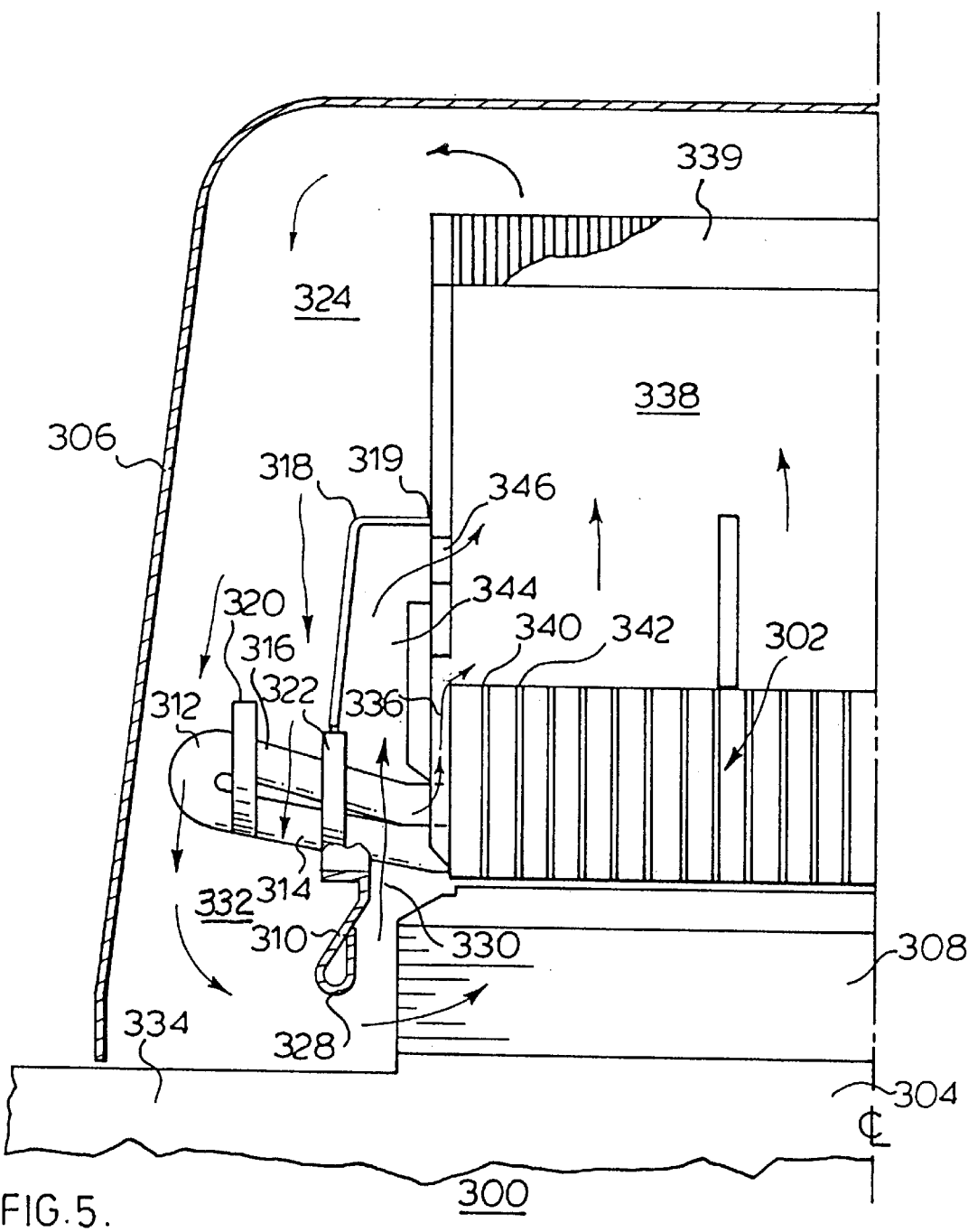
FIG. 5 illustrates a cross-sectional view of a portion of a salient pole machine having parallel air flow paths to which this invention has been applied.

An alternative construction for the machine of FIG. 4 is shown in FIG. 5. The salient pole motor 300 shown in cross-section in FIG. 5 includes a method of utilizing the present invention in a parallel air flow path ventilation system in a recirculating system with an associated heat exchanger.

The motor 300 has a stator core 302 and rotor 304 on which the salient poles 308 are mounted. The shield 310 is mounted in the same region as previously on the end coils 312 in a sealed relationship. More particularly, the shield is securely fastened to the inner coil legs 314 but the spaces between the coil legs must be completely sealed as in such a manner as shown in U.S. Pat. No. 4,442,371 issued Apr. 10, 1984, the same sealing technique may be used on motor 200 of FIG. 4.

Shield 318 is mounted on bracing ring 322 which with bracing ring 320 stabilizes the end coils of the machine outside the stator. Shield 318 must seal to the stator end frame at 319 to prevent escape of cooling air from this joint. Air enters housing 306 at duct 324 and passes over the remote ends of coil end heads 312 as the air moves inwardly toward the shaft 334. Thus, the remote ends of coils such as 312 are cooled by the cool air entering the machine. As the air passes through chamber 332, it bends around the lip 328 of shield 310 and enters the spaces between salient poles 308 and into space 330.

Figure 5A:
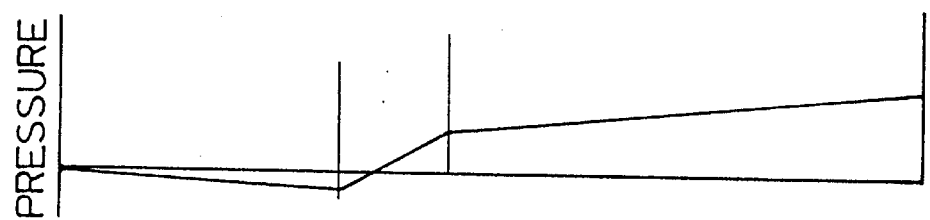
FIG. 5A shows the air pressure distribution across the air gap of the machine of FIG. 5.

The air is compressed by the rotation of rotor poles 308 and passes into the air gap and thence into the ventilation slots such as 340 and 342 of stator 302. Air will be driven from the end of the pole pieces adjacent shield 310 to compress the air in chamber 330. As previously, the shield 310 prevents the swirling vortex in the region 330 when the shield 310 is not present. The cooling air thus passes upwardly (outwardly) past the inner portions of coil legs 314 and 316 to remove heat from the surfaces thereof. The cooling air continues to move into space 344 and thence through apertures such as 346 in the stator end frame into plenum 338 and thence to heat exchanger 339 (or to atmosphere). The advantages of the system are immediately obvious. The end coils are cooled by the air passing over the coil legs in two different directions, but air is partially diverted into duct 336 to provide cooling in stator ends as previously. The pressure profile across the machine is found in FIG. 5A.

As expected, the pressure in chamber 332 is slightly negative and as the air passes lip 328 of shield 310, the pressure begins to increase because of the presence of the shield 310. The pressure continues to increase along the air gap to a maximum at the center of the machine.

The significance of this design is improved cooling of the end coils of the machine over prior art machines and increased cooling of the outward ventilation spaces 340 and 342 over the prior art machines lacking the shield 310.

Thus, the machine of FIG. 5, although a parallel air flow type machine, may be kept compact by the elimination of chambers such as 78 of FIG. 2 which require substantial space. Thus, a substantial reduction in material results and the rotor may be stiffened as previously in FIG. 4. The machine is able to function without a fan such as 96 in FIG. 1, thus, the efficiency of the machine is increased.

The presence of the shield 310 prevents the establishment of the vortex in the area 330, the presence of which represents a loss in the operation of the machine. Thus, it can be seen that the presence of a shield at the end of the stator which isolates the rotor bore in such a manner as to permit the build up of pressure on the rotor side of the shield permits more uniform air flow through the stator ventilation spaces and prevents the establishment of air vortices at the extended air gap of the motor.

The shield should extend inwardly to about the mid-point of the height of the salient poles as best shown in FIGS. 4 and 5. The axial distance between the shield and the end of the rotor poles should be in the order of pole height but physical constraints present in the motor construction may dictate the limits in the location of a shield at the stator ends of the machine.

The presence of the shields at the stator ends of the above machines is responsible for more uniform air flow through the stator ventilation ducts, and in addition, will provide a substantial increase in the total quantity of cooling air flowing through the machine, probably yielding an increase of between 5–10% net air flow when compared to a similar fanless salient pole DEM minus the shields.

It is believed that this invention provides a basic improvement to the operation of a salient pole DEM, and the presence of an energy saving device such as the efficiency shield will be a welcomed improvement in locations where the cost of energy a burden.

It cannot be emphasized too strongly that this invention finds its most useful application in fanless salient pole DEM's.

While the invention has been described in conjunction with specific embodiments, it is to be understood that many alternatives, modifications and variations will be apparent to those skilled in the art in the light of the foregoing description. The composition of the shield would typically be of a non-magnetic material such as a fiberglass reinforced plastic type of material to avoid problems with induced currents. Because the air pressure forces are quite modest, it will be possible to construct the shield such as 310 in segments to facilitate assembly. However, the invention is intended to embrace all alternatives, modification and variations which fall within the spirit and scope of the appended claims.

I claim:

1. A fanless dynamoelectric machine having salient pole means for pumping ventilation air through said dynamoelectric machine comprising a stator having a frame including stator frame end means for maintaining packets of suitable magnetic laminations in a stacked relationship to form a stator core, the packets being spaced in such a manner so as to provide ventilation ducts at predetermined locations along the axial length of said stator core, said stator having a bore therein of a predetermined diameter for receiving a salient pole rotor, said rotor being mounted on a suitable shaft, and being journalled in bearings for rotation within said stator, said stator core having suitable windings mounted in slots of said stator core for carrying electric current therein, said windings having folded end heads protruding beyond said stator frame end means, annular shield means completely encircling and being adjacent to the rotor ends and being attached to the protruding end heads of said windings of the machine, said shield means having an inner diameter substantially less than the stator bore, but greater than the diameter of said shaft, so that an annular opening exists between said shaft and said shield for allowing entrance of ventilation air to said stator bore.

2. A dynamoelectric machine as claimed in claim 1 wherein a sealing band encircles said protruding end heads of the machine adjacent to said stator frame end means, and wherein said shield means is sealed to said end heads adjacent the frame end means, said shield means also intersecting said folded end heads at a point approximately opposite said sealing band encircling said end heads, said shield means being sealed to said end heads and said band at the points of intersection of said end heads and said shield means.

3. A fanless dynamoelectric machine having salient poles for pumping ventilation air through said machine and having a stator and a salient pole rotor, said rotor being mounted on a shaft for rotation with the stator bore, stationary annular shroud means mounted on said machine adjacent said stator in the vicinity of the end of the rotor so as to completely encircle said shaft, and being sealedly secured to the machine adjacent said stator at the outer circumference of said shroud, the inner diameter of the shroud having sufficient clearance with said shaft to permit ventilation air pumped by said salient poles to pass between said shaft and said shroud.

4. A fanless dynamoelectric machine of the type having a salient pole rotor having poles of a predetermined height mounted for rotation on a rotor shaft, said machine having a stator means for receiving said rotor in a stator bore for rotation therein, said stator means having windings incorporated therein, the ends of which protrude beyond said stator means, shroud means of substantially annular shape completely encircling said shaft being mounted on said machine adjacent the ends of the rotor, said shroud means intersecting said ends of said windings, said shroud means being attached to the ends of stator means at a predetermined distance beyond said windings, the inner diameter of the shroud means being larger than the shaft diameter and substantially less than the diameter of said stator bore.

5. A dynamoelectric machine as claimed in claim 4 wherein the shroud means is sealedly attached to said stator means, said shroud means serving to shield the outer portions of said rotor poles so that only the inner portions of the rotor poles are exposed.

6. A dynamoelectric machine as claimed in claim 4 wherein stator windings project beyond the end of the stator means to form end heads, said shroud means intersecting said end heads at a predetermined distance from the end of said stator means, so that the ends of the end heads protrude through said shroud means, said shroud means being shaped to intersect and join the stator means at a circle outside said end heads, said shroud means being sealed to said end heads at the intersection thereof.

7. A dynamoelectric machine as claimed in claim 4 wherein the stator windings project beyond the ends of the stator means in the form of end heads, said annular shroud means being attached to said end heads at points intermediate their length, said shroud means including band means surrounding said end heads and extending from the point where each stator winding protrudes from said stator means to the point where said shroud means is attached to said end heads.

8. A dynamoelectric machine as claimed in claim 7 wherein said annular shroud means and said band means are sealed to said end heads, and said band means is sealed to said stator means, so that said band means and said shroud means form a sealed chamber at the end of said stator means.

9. A dynamoelectric machine as claimed in claim 8 wherein said shroud means shields the outer portions of the rotor poles so that only the inner portions of the rotor poles are exposed.

10. A method of improving the air flow distribution in the stator ventilation passages of a fanless salient pole DEM which comprises a stator, a rotor mounted on a shaft for rotation within said stator, and wherein said stator houses stator windings which extend beyond the stator ends to form endheads, comprising:

partially enclosing the stator ends of the machine with an annular shield which extends completely around but is spaced a predetermined distance from said shaft of said machine and is located inside of and sealed to said stator endheads adjacent the rotor ends to permit the machine rotor to produce a positive air pressure in said stator in areas adjacent said shield during operation of the machine.

11. A method of improving the cooling of a salient pole dynamoelectric machine wherein a salient pole rotor mounted on a shaft which is journalled in suitable bearings for rotation within a stator, providing a stator having an annular shaped ventilation passage formed between said stator and rotor for the passage of cooling air induced therethrough by rotation of said salient pole rotor within said stator, providing an enclosure in the form of an annular shield which completely encircles said shaft at a predetermined distance from the rotor, each enclosure enabling air to enter the rotor space by passage between said shaft and said shield for ventilation of said machine, each enclosure enabling said rotor to increase the pressure of the ventilation at the ventilation passage at the ends of the stator adjacent said shield during operation of the machine.

12. A method according to claim 11 wherein said enclosure has a substantial tube shaped cross-section at its inner diameter.

* * * * *